3,566,670
REENTRY VEHICLE HEAT SHIELD TESTING
APPARATUS AND METHOD
Roald Arne Rindal, Sunnyvale, Calif., assignor to
Aerotherm Corporation, Palo Alto, Calif.
Filed June 26, 1967, Ser. No. 648,792
Int. Cl. G01n 3/60
U.S. Cl. 73—15.4
3 Claims

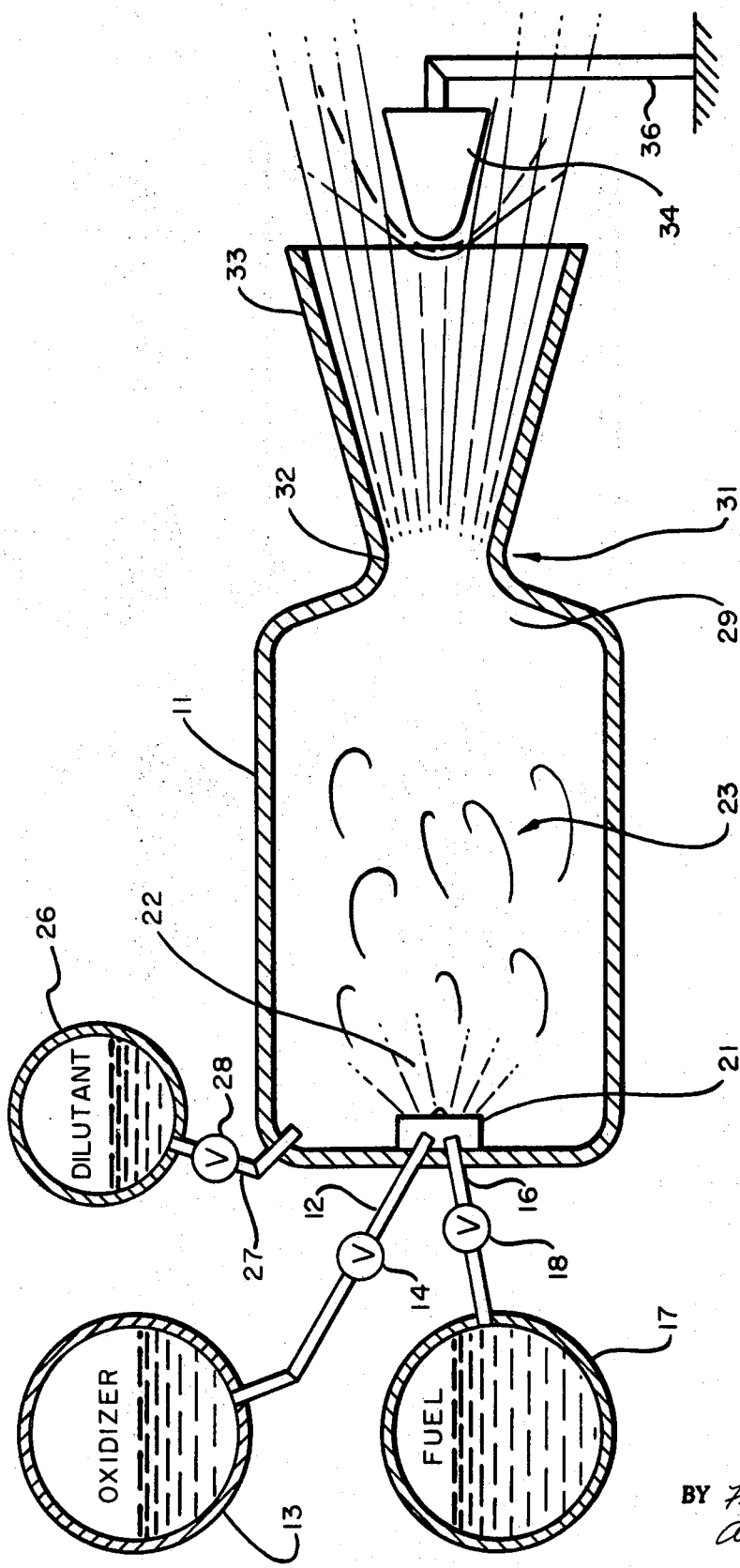

ABSTRACT OF THE DISCLOSURE

An apparatus and method for testing reentry vehicle heat shields which utilizes a high pressure hot gas generator which operates on the chemical-to-thermal energy conversion principle with an oxidizer-fuel combination which yields combustion products simulating heat shield degradation phenomena of a selected planetary atmosphere.

---

This invention relates generally to a reentry vehicle heat shield testing apparatus and method and more particularly to a testing apparatus and method capable of simulating high-temperature, high-pressure corrosion conditions encountered by the heat shield of a vehicle on entry through the planetary atmospheres such as earth's.

Reentry of a space vehicle or ballastic missile from outside the atmosphere to (or near) the surface of a planet is normally accompanied by a high heating and erosion of the windward side of the reentry vehicle. In order that the reentry mission may be accomplished successfully, it is necessary to cover the windward side with a shield that will keep the high-temperature chemically-corrosive environment away from the pay load (which may consist of scientific instruments, animal life, or a warhead). The heat shield acts as a sacrificial protector of the pay load, since the heat shield will often be destroyed, at least in part, through the combination of chemical erosion, melting, vaporization and mechanical erosion.

Acquiring the technological know-how and design parameters necessary to provide adequate protection to the advance reentry vehicle presently being designed requires conducting experiments and deducing the best design approach from the observed experimental results. In order that experiments provide useful data, it is necessary that the physical parameters controlling heat shield degradation be identified and duplicated in the experiment.

The most meaningful experiment is one which enables complete simultaneous duplication of all pertinent physical parameters.

Presently, the only experimental means for accomplishing complete duplication of all pertinent parameters simultaneously is to fly the reentry vehicle on the reentry trajectory of interest. The vehicle's heat shield in such a test is instrumented in such a manner that the interesting events (such as heat shield temperature, history and surface erosion rate) are measured and the information transmitted to receiving stations for recording and subsequent interpretation. To conduct such flight experiments is very expensive and for this reason, it is economically attractive to conduct relatively inexpensive ground based experiments even though complete duplication of all pertinent parameters is not achieved.

At present, three basic types of ground based simulators are being employed to acquire heat shield design data. These simulators, each operating on a different principle, are (1) the arc plasma generator; (2) the wave superheater; and (3) the rocket exhaust or chemical jet.

The operating principles of the first two simulators are such that they may be operated on any one, or a mixture, of a large number of test gases and thus can simulate the chemical erosion which would be encountered in the planetary atmosphere of interest. The third simulator, the rocket exhaust, does not enable duplication of the chemical erosion characteristics. Simulation of surface temperature and distribution through the heat shield material can be achieved by each of the simulators discussed. Simulation of temperature distribution along the heat shield surface, however, requires testing full scale models. This can be accomplished generally only with the rocket exhaust simulator because the arc plasma generator and wave superheater are limited to subscale test models. Pressure level on the heat shield surface can be simulated by each of the devices. However, the simulation of pressure distribution may be approached only with the rocket exhaust simulator which enables testing full scale heat shields.

Near full scale vehicles may be tested in each type of simulator, but not while maintaining a high pressure level. Reentry simulation for any heat shield of interest requires simultaneous duplication of pressure and size. Present operational arc plasma generators and wave superheaters are limited to testing models of less than one inch diameter when operating at maximum pressure. The rocket exhaust type simulator is not limited to any particular size by present state of the art design capability. However, as described above, such a simulator is not capable of providing information with regard to chemical erosion.

The rocket exhaust simulator employs a liquid propellant rocket engine having oxidizer and fuel storage systems, feed lines, regulating and metering equipment, and an injector suitable for causing the oxidizer and fuel to be brought into intimate contact in a combustion chamber so that they will chemically react. An igniter is provided to initiate combustion. A convergent-divergent expansion nozzle accelerates the flow of the combustion products to a high velocity. The combustion products impinge upon the test model located in or near the divergent portion of the nozzle.

It is a general object of the present invention to provide a ground based simulator for testing reentry vehicle heat shields which will provide substantially better simulation than the ground based simulators discussed above.

It is another object of the present invention to provide a simulator which combines large, high pressure capability such as that achieved with a rocket exhaust simulator with the capability of simulating the chemical erosion characteristics of planetary atmospheres as well.

It is a further object of the present invention to provide a ground based simulator which operates on the principle of a rocket engine in that the oxidizer and fuel are brought together in a combustion chamber where they react chemically to yield high temperature products. However, the present invention contemplates such a device in which the oxidizer fuel combinations are selected so that when they react, they form high temperature products having substantially the same chemical erosion characteristics as the atmosphere gases of a selected planet.

It is another object of the present invention to provide a simulator of the above type in which the injector and combustion chambers are designed to yield complete mixing of the oxidizer and fuel such that the flow entering the nozzle throat will be uniform in composition and the elemental composition will correspond to the input oxidizer fuel mixture ratio.

According to the present invention, there is provided a simulator which is quite similar to the rocket exhaust simulator described above but which employs (1) an oxidizer and fuel combination and mixture ratio of the same which is specifically selected to yield exhaust products which have the same chemical erosion characteristics as the planetary atmosphere of interest; (2) an injector and combuston chamber designed to yield complete mixing of the oxidizer and fuel such that the flow entering the nozzle throat will be uniform in composition and the elemental composition will correspond to the input oxidizer-fuel mixture ratio; and (3) a convergent-divergent expansion nozzle which gives the desired stream size and total pressure on the surface of the heat shield test model.

The foregoing and other objects of the present invention will be more clearly understood from the following description of the single drawing.

Referring to the drawing, there is shown an exhaust-type simulator in accordance with the invention. The simulator includes a combustion chamber 11 into which are injected fuel, oxidizer and dilutants. Oxidizer is supplied to the chamber via feed line 12 connected to oxidizer storage tank 13 in which the oxidizer is maintained at high pressure relative to the combustion chamber pressure. A valve 14 may be included in the feed line 12 for controlling the amount of oxidizer which flows into the combustion chamber 11. A feed line 16 connects the fuel tank 17, which contains fuel at high pressure relative to the combustion chamber pressure. A valve 18 may be provided for controlling the amount of fuel which flows into the combustion chamber 11. The oxidizer and fuel are applied to an injector 21 which serves to inject the oxidizer and fuel into the combustion chamber where they are mixed and combusted.

An igniter or a slug of hypergolic oxidizer, not shown, serves to ignite the mixture which then forms high temperature combustion products 23. Selected dilutant gases may be injected into the combustion chamber 11 from the storage tank 26 via feed line 27 which may include a control valve 28. The high-temperature, high-pressure combustion products and dilutant impinge against the convergent section 29 of the nozzle 31, flow through the throat 32 and through the divergent section 33. The high-velocity, high-temperature products flowing from the nozzle impinge upon the test model 34 supported on suitable support 36.

The injector and combustion chamber are designed to yield complete mixing of the oxidier and fuel such that the flow entering the nozle throat will be uniform in composition and the elemental composition will correspond to the input oxidizer-fuel mixture ratio. In order to achieve the foregoing, the combustion chamber design will differ from that of a conventional rocket engine test stand. The characteristic length L=chamber volume/nozzle throat cross-section area is substantially greater than the typical characteristic length of 3 to 6 feet. The characteristic length will depend upon the degree of mixing produced by the injector. It is believed that lengths of 6 to 15 feet will be typical.

The nozzle is designed to produce the desired pressure level and pressure distribution over the test model. The high-temperature, high-pressure products heat the model and chemically react with the surfaces of the same to simulate reentry through a selected planetary atmosphere.

As previously explained, the oxidizer and fuel combination which reacts to form the high pressure combustion products are selected to have the same chemical erosion characteristics as the selected planetary atmospheric gas. The interaction on the surface of the test model will simulate the atmospheric conditions if chemical equilibrium is achieved at the surface of the test model. The minimum pressure and minimum temperature for which this assumption is valid cannot be simply stated since it depends upon the specific material being tested. It is safe to state that the assumption will be valid for pressure-temperature combinations exceeding one atmosphere and 4000° R., respectively. For some prospective heat shield materials, chemical equilibrium is achieved at lower pressures and temperatures. For these materials the simulation will be valid for lower temperatures and pressures.

In accordance with the present invention, the method of obtaining the simulation of various atmospheric environments at high temperatures and pressures consists of combusting a selected fuel with an oxidizer while maintaining a predetermined mixture ratio to provide the desired products of combustion. Appropriate dilutants can be added to approach complete simulation.

For example, the Martian and Earth's atmospheres can be simulated by combustion of dicyanoacetylene ($C_4N_2$), cyanogen ($C_2N_2$), or cyano (CN) with oxygen ($O_2$), ozone ($O_3$) or nitrogen tetroxide ($N_2O_4$) at specific mixture ratios. For example, the combustion of cyanogen with excess oxygen will yield N, $N_2$, CO, $CO_2$, $O_2$, O and other less significant species such as $N_2O$, $NO_2$, NO, CN, etc.

More specifically, to simulate the Earth's and Mars' atmospheres, the following mixtures of oxygen and cyanogen are required.

EARTH $C_2N_2+1.786O_2$ provides combustion products having a mixture of carbon, nitrogen and oxygen compounds simulating the chemical erosion characteristics of air. The corresponding total temperature depends upon the chamber pressure. For a chamber pressure of 200 atmospheres, the total temperature is approximately 8100° R.

MARS $.306C_2N_2+.387O_2+.08A$ provides combustion products having a mixture of carbon, nitrogen and oxygen compounds and A (argon) dilutant simulating the chemical erosion characteristics of the Martian atmosphere. The corresponding total temperature is approximately 9000° R. at 200 atmospheres chamber pressure.

The ability to simulate planetary atmospheres, as described above, was established by comparing the predicted thermochemical ablation rates for the $C_2N_2+O_2$ mixture with the predicted thermochemical ablation rates for air and other test gases on carbon and a number of materials of interest. The predictions were performed by employing accepted procedures for evaluating mass and energy transfer rates in the high temperature, chemically reacting boundary layer and were based upon the assumption that chemical equilibrium is achieved at the ablating surface.

First, the importance of test gas composition on thermochemical ablation phenomenon was considered. The ablation rate of graphite for various gaseous mixtures was considered. These mixtures included fluorine-hydrogen, LOX-ethanol ($O_2=C_2H_5OH \cdot H_2O$), fluorine-ammonia, nitrogen, helium, argon, and a mixture of cyanogen and oxygen ($O_2=C_2N_2$). The products formed when employing the cyanogen-oxygen mixture for simulating earth's atmosphere, as described above, are the same as those formed for the ablation of carbon in air. It was found that there was a marked difference in ablation rates of graphite for a number of the test gases of interest. However, there was a marked similarity between the ablation rate of graphite in air and in the cyanogen-oxygen mixture.

This alone, however, does not demonstrate a general similarity between air and the cyanogen-oxygen mixture since it is restricted to a single material, graphite (or carbon). This only demonstrates that simulation is achieved for carbon, but the thermochemical ablation phenomenon for other heat shield materials of possible interest remains to be demonstrated. The degree of thermochemical ablation simulation for other materials in the cyanogen-oxygen mixture were predicted. Reinforced organic composites, metal oxides, metal nitrides, carbides and the elements, tungsten and carbon, were considered. The results of the analysis showed conclusive evidence that the cyanogen-oxygen mixture did simulate, in all respects, heat shield thermochemical degradation phenomenon resulting from entry of high performance reentry vehicles through the earth's atmosphere.

Thus, there has been provided an improved method for testing heat shield materials. The method provides for testing of full scale models of heat shield materials under the same thermochemical and pressure conditions as are encountered in selected planetary atmospheres.

I claim:

1. The method of testing materials under conditions simulating entry through a planetary atmosphere which comprises the steps of combusting a predetermined mixture of a fluid fuel selected from dicyanoacetylene or cyanogen with an oxidizer selected from oxygen, ozone or nitrogen tetroxide in a combustion chamber, said fuel, oxidizer and mixture being selected to yield combustion products which simulate the chemical erosion encountered in the planetary atmosphere of interest, allowing adequate time in said combustion chamber for said fluid fuel and oxidizer to substantially reach thermochemical equilibrium, and then forming a high velocity stream of said combustion products for impingement upon the material being tested.

2. The method as in claim 1 wherein said fuel and oxidizer mixture is as follows:

$$C_2N_2 + 1.786 O_2$$

3. The method as in claim 1 wherein a dilutant is introduced into said combustion chamber and the fuel, oxidizer and dilutant mixture is as follows:

$$.306 C_2N_2 + .387 O_2 + .08 A$$

References Cited

UNITED STATES PATENTS

| | | | |
|---|---|---|---|
| 3,121,329 | 2/1964 | Bennett | 73—147 |
| 3,191,435 | 6/1965 | Weller | 73—147 |
| 3,374,679 | 3/1968 | Richards et al. | 73—147 |
| 3,392,577 | 7/1968 | Barr et al. | 73—147 |

JAMES J. GILL, Primary Examiner

J. K. LUNSFORD, Assistant Examiner

U.S. Cl. X.R.

73—86, 147